M. M. Latta,
Fracture Apparatus.
N° 35,014. Patented June 17, 1862.
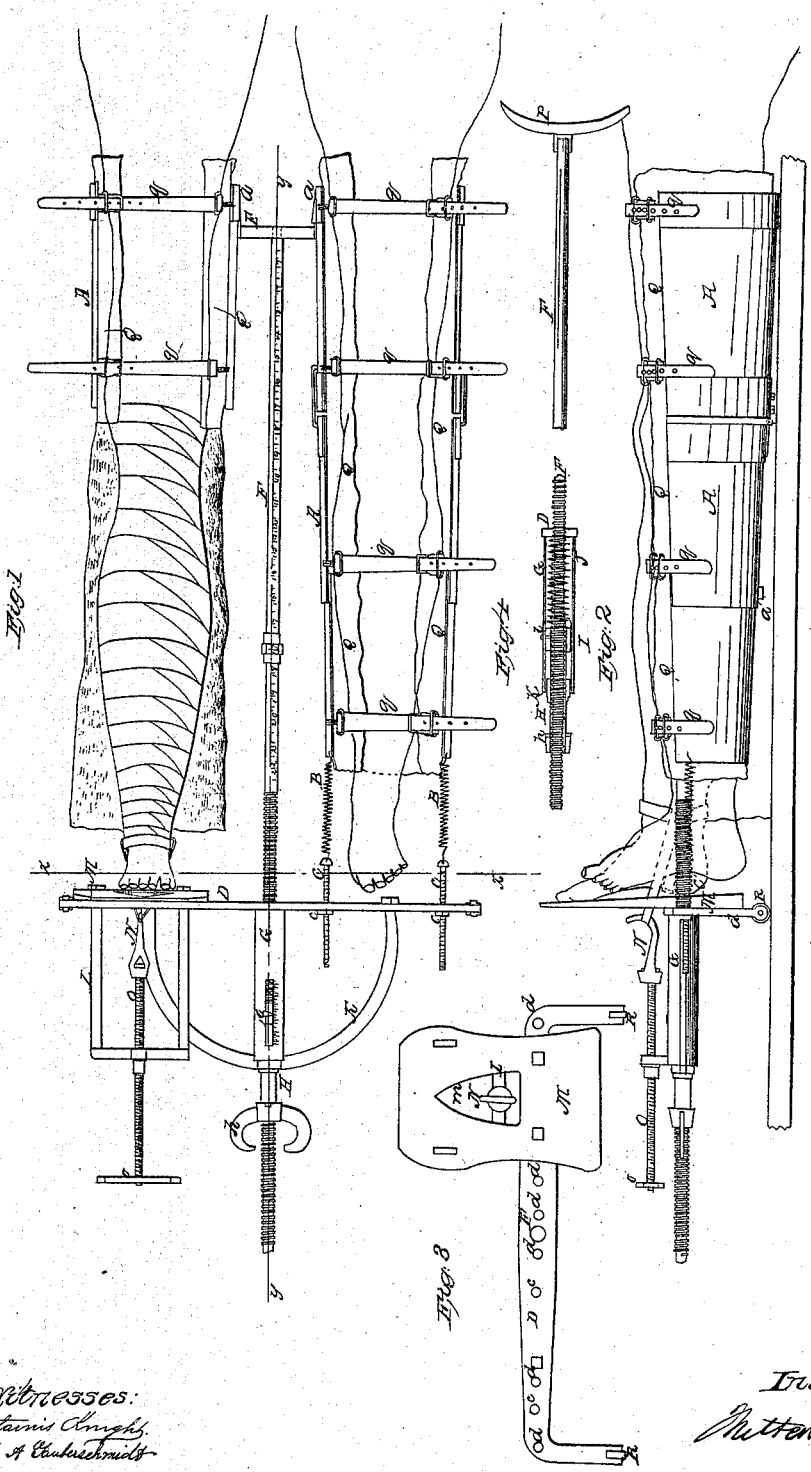

UNITED STATES PATENT OFFICE.

MILTON M. LATTA, OF GOSHEN, INDIANA.

IMPROVEMENT IN SURGICAL SPLINTS.

Specification forming part of Letters Patent No. 35,614, dated June 17, 1862.

*To all whom it may concern:*

Be it known that I, MILTON M. LATTA, of Goshen, in the county of Elkhart and State of Indiana, have invented certain new and useful Improvements in Surgical Splints; and I do hereby declare the following to be a full and exact description of the same, reference being had to the accompanying drawings, making part of this specification, in which—

Figure 1 is a plan or top view of a splint and its appurtenances illustrating my invention. Fig. 2 is a side elevation of the same. Fig. 3 is a transverse section at $x\ x$. Fig 4 is a vertical section at $y\ y$, Fig. 1, illustrating the manner of adapting the apparatus for measuring purposes, as hereinafter explained.

Similar letters of reference indicate corresponding parts in the several views.

The subject of this invention is a splint designed chiefly for the treatment of fractures and other diseases of the long bones of the thigh and leg, and in certain cases of the arm also. The instrument is also applicable for measuring purposes, as will be explained.

The invention particularly consists, first, in a method of making the counter-extension upon the splint so as to avoid pressure upon tender parts of the person; second, in applying the splint upon which the counter-extension is produced to the sound instead of to the diseased limb; third, in the use of a spring and index to show the amount of extending force applied; fourth, in devices hereinafter described for equalizing the extending force and preventing friction and obstruction in the motion of the parts; fifth, in a method of measurement by which the relative length of a healed and an uninjured limb can be correctly determined; sixth, in an improved manner of applying the foot-board.

To enable others skilled in the art to make and use my invention, I will proceed to describe its construction and operation.

A is a long jointed "bed-splint" attached by springs B B to screw-rods C C, which pass through perforations $d$ in a cross-bar, D, at any desired distance on either side of its center, and are held by nuts $c\ c$.

A' is a shorter bed-splint.

The splints A A' are provided with sockets $a\ a$ on their sides to receive a cross-head, E, upon the forward end of a rigid extension-rod, F. The rear end of the said rod is screw-threaded to some distance, and passes through the center of the cross-bar D and through a cylinder, G, projecting backward therefrom.

H is an elongated nut or sleeve threaded upon the shaft F and adapted to turn freely within a coupling-collar, I, upon its front end, but confined from longitudinal motion within the said collar by means of a flange, pin, or any other suitable device. The collar I is adapted to slide freely within the cylinder G as it is carried by the nut.

J is a spiral spring attached at its front end to the cross-bar D and at its rear end to the collar I.

K is a yoke attached at each of its extremities to the cross-bar D and passing around the rear end of the cylinder G, so as to confine it between the said yoke and cross-bar. The yoke K affords a bearing within which the nut or screw-sleeve H turns and slides freely.

$h$ is a key by which the nut H is turned.

A smaller yoke, L, and a foot-board, M, are secured adjustably to the cross-bar D at any distance from the center and at the opposite end from that at which the long splint A is attached, as before stated. The foot-board is formed with a central aperture, $m$, Fig. 3, to accommodate the extension-loop, as hereinafter explained.

N is a hook swiveled upon the end of a screw-rod, O, which is threaded in the yoke L.

$o$ is a key by which the rod O is rotated.

The ends of the cross-bar D are bent in the form represented in Fig. 3, so as to produce downwardly-projecting arms $d$, in the lower ends of which are placed rollers R R, to adapt the bar to move freely upon any smooth and hard surface.

P is a crutch-head, which is substituted for the cross-head E at the upper end of the shaft F, for measuring purposes.

$i$ is an index or pointer projecting from the collar I through a slot in the cylinder G, and serving to indicate by means of a scale upon the said cylinder (see Fig. 1) the degree of tensional force exerted on the spring.

The manner of using the apparatus is as follows: The drawings represent the parts in position for treatment of a fracture of the right leg. The sound limb is first placed in the bed-splint A and the diseased limb in the splint A', both being protected by cushions Q and secured by straps $q$ with sufficient firmness to give steadiness. The cross-head E is then slipped into the sockets $a$ $a$ and the springs B B attached. The adhesive plasters having been applied and properly secured to the sides of the affected limb, so as to form a loop below the sole of the foot, the said loop is then passed through the aperture $m$ and attached to the hook N, and the latter retracted by means of the screw-rod O until the sole of the foot is drawn smoothly against the foot-board. A sufficient degree of extension is then produced by turning the nut H by means of the key $h$, after which the seat of the fracture is dressed with side splints in customary manner.

By making the lower member of the long splint A in two pieces secured together by clamp-nuts $a'$ the said splint may be lengthened or shortened, as required, and thus adapted for limbs of any length.

For treating the left leg the long splint A and its appurtenances are changed to the right side and the short splint A', foot-board M, yoke L, &c., to the left.

To suit different classes of fractures and of subjects, the rods C C and yoke L may be set nearer together or farther apart by inserting them in any of the holes $d$ $d$.

If the weight of the sound limb and the consequent friction upon the splint A be not sufficient to resist the counter-extension, any necessary friction can be produced by tightening the straps $q$. In either case the pressure is exerted on the head of the sound bone, which is adapted to bear many times the amount of pressure with perfect impunity, instead of by ligatures around the groin, as in modes generally in use.

It is very difficult by any ordinary means to ascertain the exact length of a limb when the patient has an interest in deceiving the surgeon. He may produce apparently, an actual shortening or elongation of the limb by voluntary contraction or extension of the muscles, and various other devices.

When the above-described apparatus is to be used to measure the relative length of a healed and an uninjured limb, the splints A and A' and cross-head E are removed and the crutch-head P substituted for the latter, the shaft being made sufficiently long by screwing on an additional link, if needful. The crutch being then placed under the groin, one of the feet is connected to the hook N and a sufficient degree of extension produced to overcome all voluntary muscular contraction. The length of the leg may then be accurately measured by the scale upon the shaft F, after which the nut H is turned back so as to release the spring J. The yoke L and its accessories are then moved to the other side, the other foot attached, an equal extension force applied, and the measure taken. The relative length of the limbs can thus be exactly determined, and as the measurement proceeds from a fixed point exactly alike on both sides all elements of doubt or deception are removed.

A portion of the above invention, with such modifications as will readily suggest themselves to the mind of the skillful practitioner, may in some cases be applied to the treatment of fractures and diseases of the arm.

The above-described apparatus possesses the following advantages over those in common use:

First. The counter-extension is made wholly upon the splint itself, thus avoiding the pressure on and injury to the soft parts, as is liable to be the case with all of the usual methods. As no pressure is made on any tender part there is no danger that the extension will have to be slackened at any time during the treatment, at the risk of shortening the limb.

Second. The main dressing is applied on the sound limb, thus making the extension permanent without interfering with the dressing of the fractured or diseased limb. The swelling or shrinking of the broken limb, with the consequent displacement of bandages, will have no power to produce shortening, the extension being independent of all such conditions.

Third. The index and scale show the surgeon at a glance whether there has been any displacement of the apparatus—thus, if after the necessary amount of extension is effected the register stands at any particular figure it is only requisite to make a note of the fact, that can be referred to at a future visit, and so long as the register remains at the same point there can be no displacement.

Fourth. In case of ulceration of the head of the thigh-bone there is often as much tenderness on the inside as on the outside of the joint. As this instrument is applied on the opposite side, no inconvenience is felt and no delay need be suffered. The tenderness of the groin frequently makes it impossible to continue the necessary counter-extension. All this is obviated by placing the dressing on the sound limb.

Fifth. The counter-extension being made from the sound limb, the dressing immediately about the fracture can be removed at pleasure, enabling the surgeon to see at all times the condition, and to make out accurately the shape and length of the limb. All this is impossible when the dressing envelops the limb.

Sixth. In case of compound fracture, full extension can be kept up without any dressing whatever having been applied to the affected limb.

Seventh. The extension being made on the sound side (and not to be affected by fluctuations in the size of the limb) can be made permanent from the very first, and it is claimed that by keeping the parts exactly in position and without movement the time required to effect a union may be materially lessened.

Eighth. The extension being made on the limbs themselves enables the patient to sit up or lie down at pleasure. The advantages thus derived to the patient are obvious. In the only method within my knowledge which admits of this change of position the patient is attached to the bed, and there is the insuperable objection that the seat of the fracture is covered up and the shape and condition of the limb concealed from observation.

Ninth. In case of fracture of the neck of the femur the apparatus applied on the sound side will make extension in a manner so easy as to be borne much better than by any other method. In such cases no attempt would be made to apply dressing on the seat of fracture.

Tenth. The extension attachment being applied to the foot independently of the foot-board admits of the foot being exposed or released at will for measuring, inspection, or any purpose.

Eleventh. By dressing the limb naked any lateral projection of the bone can be readily observed.

Twelfth. A method is afforded for determining the relative length of a healed and an uninjured limb with accuracy and without the possibility of deception.

The short splint A' is not essential to the invention, and in some cases will be entirely dispensed with. When the fracture is below the knee, the dressings may, if preferred, be applied in the form of a double-inclined plane.

Having thus described my invention, what I claim therein as new, and desire to secure by Letters Patent, is—

1. Applying the counter-extension to the splint instead of to the person, substantially as set forth.

2. Applying the principal dressing to the sound limb, substantially as set forth.

3. The use of a spring and index or equivalent devices, substantially as described, to show the amount of extending force applied.

4. Attaching the cross-bar D to the long splint A by springs B B, which permit the descent of the cross-bar, retain the splint in correct position, and equalize the tension upon both ends of the bar, so as to cause it to slide freely on the shaft F.

5. Supporting the cross-bar D upon a truck-frame, substantially as described, to adapt it to move without obstruction.

6. The combination of the graduated crutch P, extension devices L N O, spring J, and index $i$, for the purpose of measuring the relative length of a healed and an uninjured limb, as explained.

7. In combination with a foot-board, M, rigidly secured to the cross-bar D, the application of the extension to the foot independently of the said foot-board, substantially as and for the purposes described.

MILTON M. LATTA.

Witnesses:
OCTAVIUS KNIGHT,
CHARLES SMITH.